INVENTOR.
Carl D. Graber
BY
Frease, Bishop, Johns & Schick
ATTORNEYS

Oct. 23, 1962 C. D. GRABER 3,059,839

AFTER-HOUR DEPOSITORY

Filed Oct. 11, 1960 8 Sheets-Sheet 2

INVENTOR.
Carl D. Graber
BY
Fresse, Bishop, Johns & Schick
ATTORNEYS

Oct. 23, 1962 C. D. GRABER 3,059,839

AFTER-HOUR DEPOSITORY

Filed Oct. 11, 1960 8 Sheets-Sheet 3

INVENTOR.
Carl D. Graber
BY
Frease, Bishop, Johns & Schick
ATTORNEYS

Oct. 23, 1962 C. D. GRABER 3,059,839

AFTER-HOUR DEPOSITORY

Filed Oct. 11, 1960 8 Sheets-Sheet 4

INVENTOR.
Carl D. Graber
BY
Frease, Bishop, Johns & Schick
ATTORNEYS

INVENTOR.
Carl D. Graber
BY
Frease, Bishop, Johns & Schick
ATTORNEYS

Oct. 23, 1962 C. D. GRABER 3,059,839

AFTER-HOUR DEPOSITORY

Filed Oct. 11, 1960

8 Sheets-Sheet 6

INVENTOR.
Carl D. Graber

BY

Frease, Bishop, Johns & Schick

ATTORNEYS

Oct. 23, 1962 C. D. GRABER 3,059,839

AFTER-HOUR DEPOSITORY

Filed Oct. 11, 1960

8 Sheets-Sheet 7

INVENTOR.
Carl D. Graber

BY Frease, Bishop, Johns & Schick

ATTORNEYS

INVENTOR.
Carl D. Graber
BY
Frease, Bishop, Johns & Schick
ATTORNEYS

United States Patent Office 3,059,839

Patented Oct. 23, 1962

3,059,839

AFTER-HOUR DEPOSITORY

Carl D. Graber, Orrville, Ohio, assignor to Diebold, Incorporated, Canton, Ohio, a corporation of Ohio Filed Oct. 11, 1960, Ser. No. 62,042
19 Claims. (Cl. 232—44)

This invention relates to improvements in an after-hour depository. More particularly it pertains to a depository construction having means to prevent and deter tampering or entry by unauthorized persons.

After-hour depositories are used by banks and similar institutions to enable bank customers to deposit packages or envelopes of money or other valuables during the hours when the bank is closed. Prior bank depositories have been used for the deposit of bags and/or envelopes containing money and similar valuable items but have been unsatisfactory for various reasons. Most of the prior bank depositories have been manually operated and have been susceptible to surreptitious entry by unauthorized persons.

Many depositories have been provided with doors for the deposit of envelopes and/or for bags and packages of money, which doors serve merely to close the depository opening after each deposit. Other depositories have been provided with doors which function with internally operating parts to direct the deposited item into a chute leading to a protective container such as a safe or money chest. Indeed, the usual combination of a door functioning with internal operating parts of the depositories in prior constructions has provided the door as an anti-fishing and trapping means. For example, when the door was open the internal operating parts of the depository blocked an otherwise direct path to the chute and when the door was closed the internal operating parts were located in positions which would not block access to the chute, whereby easy access could be had for fishing deposited articles out of the safe through the depository chute if the connection between the door and the internally operating parts were altered by an unauthorized person.

It has also been found that a thief having access to the depository can coat the inside walls of the receiving compartment of the depository with an adhesive material so that a subsequently deposited envelope of money adheres to the adhesive and is returned to the original position instead of dropping into the chute in the use of most prior depository constructions.

Some prior depositories have been constructed to enable theft by the attachment of a block on the inner surface of the depository door to prevent the door from being completely closed. Thereafter an unsuspecting person who has made a deposit assumes when the door is lowered that it is completely closed and that the deposited article is safe. The device of the present invention is provided with means for alerting a depositor that the door is not completely closed. As a further security measure the device is also provided with means for locking a partially closed door in place. In addition, the device is provided with a light that operates automatically only when the depository is operating normally. If the light is not turned on, the depositor is alerted that the depository is out of order.

In accordance with the invention, an electric power depository is provided with doors covering the depository openings which are locked in the closed position during the operation of the depository. The act of closing the doors initiates both the locking of the door as well as actuating the power means for operating the depository. With an electrically operated depository, the depository doors are locked in place if the electric power supply fails.

The improved construction uses a rotary drum as an internally operating part of the depository which is rotated by an electric motor. The act of depositing an envelope or bag of money is controlled by providing a one-revolution cycle for the drum which in turn controls the power drive of the entire depository. This construction preferably is also provided with suitable means for not only locking the doors closed during operation of the depository but also for preventing jamming of the electric motor which powers the depository if and when the depository doors are forced open, such as by use of a wrecking bar. In conjunction with the use of the doors as means for initiating the depository cycle, the doors are provided with inwardly projecting fins which push a bag or envelope completely into the receiving compartment of the depository to permit complete closure of the door.

In addition to the foregoing, the depository is preferably provided with intermeshing plate means which help to defeat any attempt to fish items out of the depository chute when the door is forced open. Moreover, the rotor, which is preferably a cylindrical member, is provided with a completely closed outer wall except for an opening alignable with the door openings and as a result of providing the chute at a diametrically opposite side of the rotor, the limited size of the opening cooperates with the intermeshing plate means to defeat any access whatsoever to the contents at the lower end of the depository chute.

Where an envelope is deposited in the improved depository which has been previously covered with adhesive material to cause the envelope to adhere thereto and therefore to attempt to prevent the envelope from dropping into the depository chute during normal operation of the rotor, the intermeshing plates cooperate, in conjunction with segments of the rotor as they turn, to cute the envelope and its contents into shredded parts rather than to permit the envelope to return to the original deposited position where it might be withdrawn by an unauthorized person.

Accordingly, it is a general object of this invention to provide an after-hour depository which is theft-proof and burglar-proof at all times, regardless of careless operation by a depositor or improper operation induced by an attempt to take defeat measures.

It is another object of this invention to provide an after-hour depository which upon deposit of an article in the reception compartment operates completely automatically to empty the chamber for a subsequent deposit.

It is another object of this invention to provide an after-hour depository having depository doors which when opened automatically initiate conditions for a cycle of operation for securing a deposited article.

It is another object of this invention to provide an after-hour depository having doors which when closed subsequent to the deposit of an article through the door opening, automatically sets the depository into motion.

It is another object of this invention to provide an after-hour depository having power operated mechanism which is initiated into action upon closing of the door of the depository chamber.

It is another object of this invention to provide an after-hour depository having power operated mechanism which automatically locks the doors of the depository during the cycle of operation of the mechanism.

It is another object of this device to provide an after-hour depository having a power operated drive which requires and is limited to operation through one revolution for deposition of a deposited article.

It is another object of this invention to provide an after-hour depository having a rotatable drum with an article-receiving chamber, which drum is composed of a plurality of spaced transverse drum segments and in which spaced plates are provided between the segments for clearing the receptacle and for preventing looting of the depository.

It is another object of this invention to provide an after-hour depository having a rotor with means for preventing backward rotation thereof.

It is another object of this invention to provide an after-hour depository in which the doors for the article opening are provided with inwardly projecting means for pushing a deposited article into the receiving chamber to facilitate complete closing of the door.

It is another object of this invention to provide an after-hour depository in which spaced plate means are provided to destroy envelopes which are deposited and which fail to drop into the depository chute during the operation of the depository cycle.

It is another object of this invention to provide an after-hour depository having means for locking a partially closed depository door in place and thereby protect the unsuspecting depositor against theft of his deposited goods.

It is another object of this invention to provide an after-hour depository having signal means for indicating to the depositor that the depository is functioning and has functioned in a normal manner to deliver the deposited article to a depository chute.

Finally, it is an object of this invention to provide a novel and improved depository which is economical to manufacture, easy to operate and which requires a minimum amount of maintenance and repair.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicant has contemplated applying the principles—is set forth in the following description and shown in the drawings, and which is particularly and distinctly pointed out and set forth in the appended claims forming part hereof.

In general terms the present invention may be described as comprising a depository having a housing mounted in a building wall for discharging into a chute of a depository vault, a rotary cylinder within the housing and having a receiving compartment into which deposited articles are placed through an opening in the housing, power means for automatically rotating the cylinder through one complete revolution, the housing also having door means covering the opening, means operative when the door is opened for deposit of an article into the compartment to set the power mechanism in readiness for rotation of the cylinder upon closing of the door means, whereby rotation of the cylinder moves the receiving compartment from alignment with the housing opening into alignment with the chute of the deposit vault so that the deposited article drops into the chute, and then into realignment with the opening in the housing.

Referring to the drawings forming part hereof in which the preferred embodiment is shown by way of example:

Figure 15:
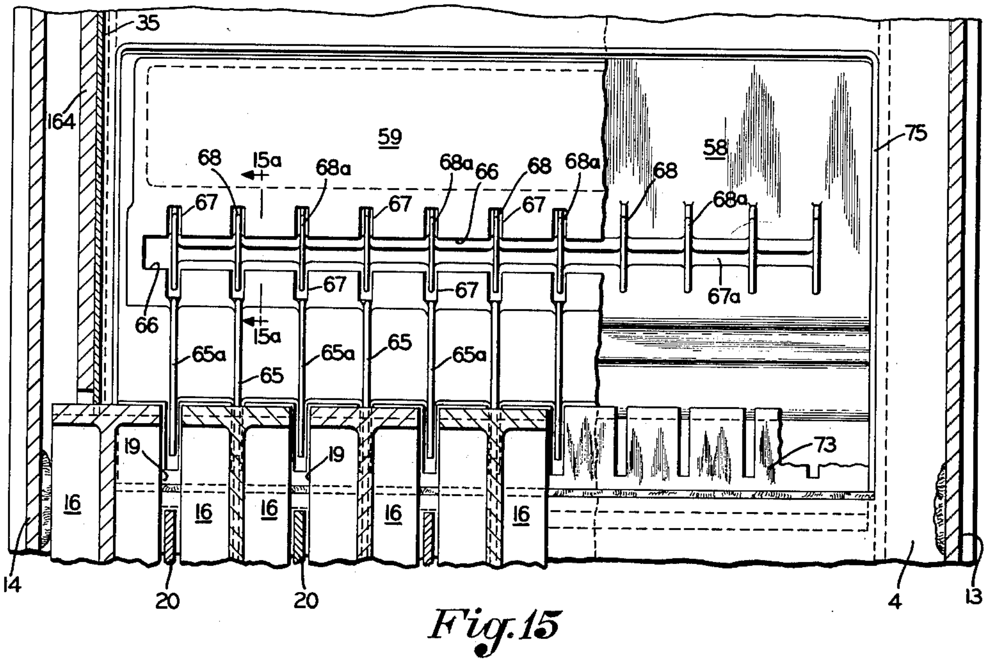
Figure 2:
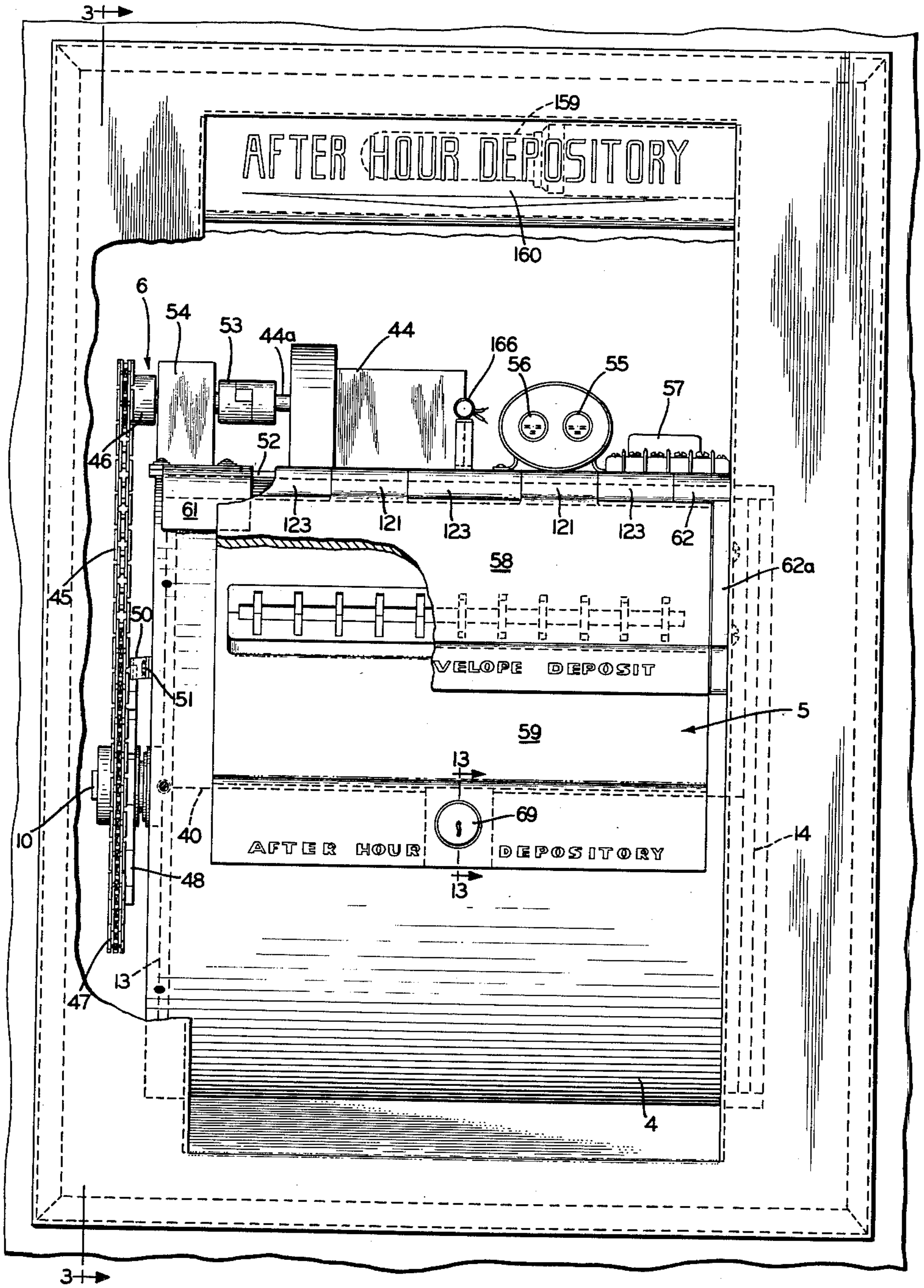
FIG. 2 is a front elevational view, partly broken away, showing the means for rotating the depository and showing the envelope deposit slot.
Figure 3:
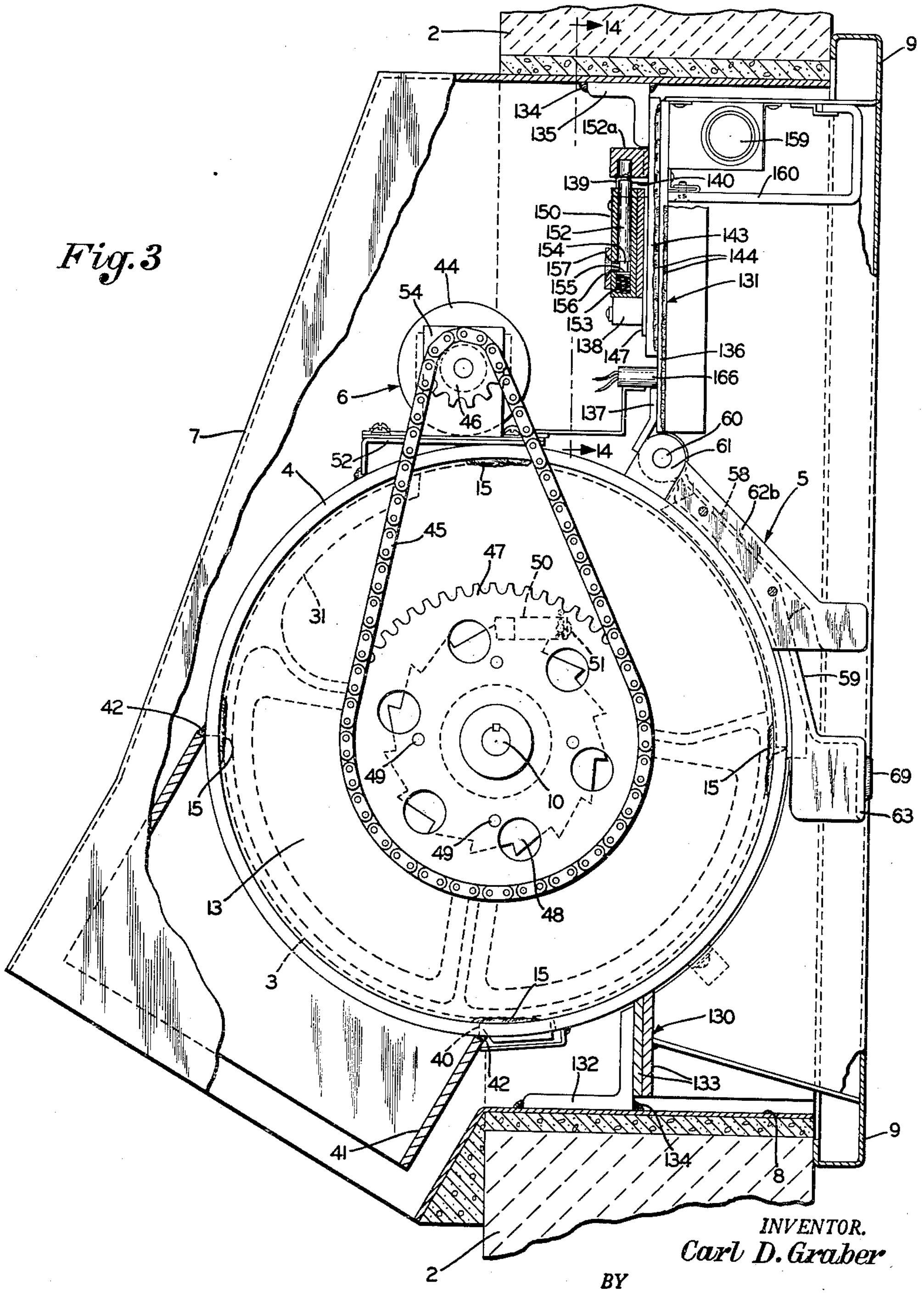
FIG. 3 is a sectional end view, partly in elevation, showing the depository mounted in the wall of a building.
Figures 4, 5, 5A, 6:
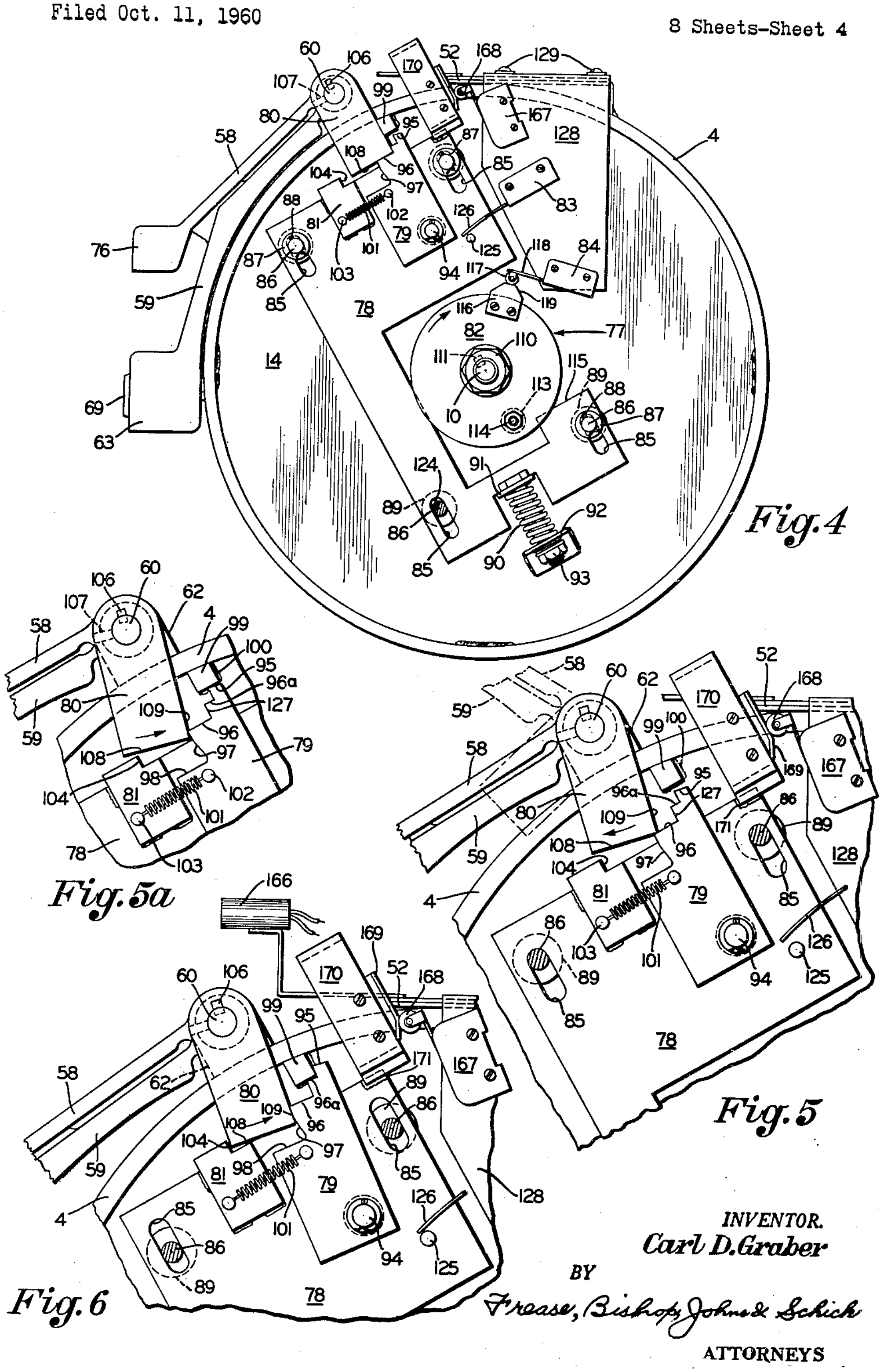
FIG. 4 is an end view opposite that of FIG. 3, showing the rotor housing and the door locking mechanism.
FIG. 5 is an enlarged fragmentary view of the locking mechanism of FIG. 4, showing the first step for actuating the mechanism during the opening of the depository doors and showing (in broken lines) the doors completely open.
Figures 7, 8, 9:
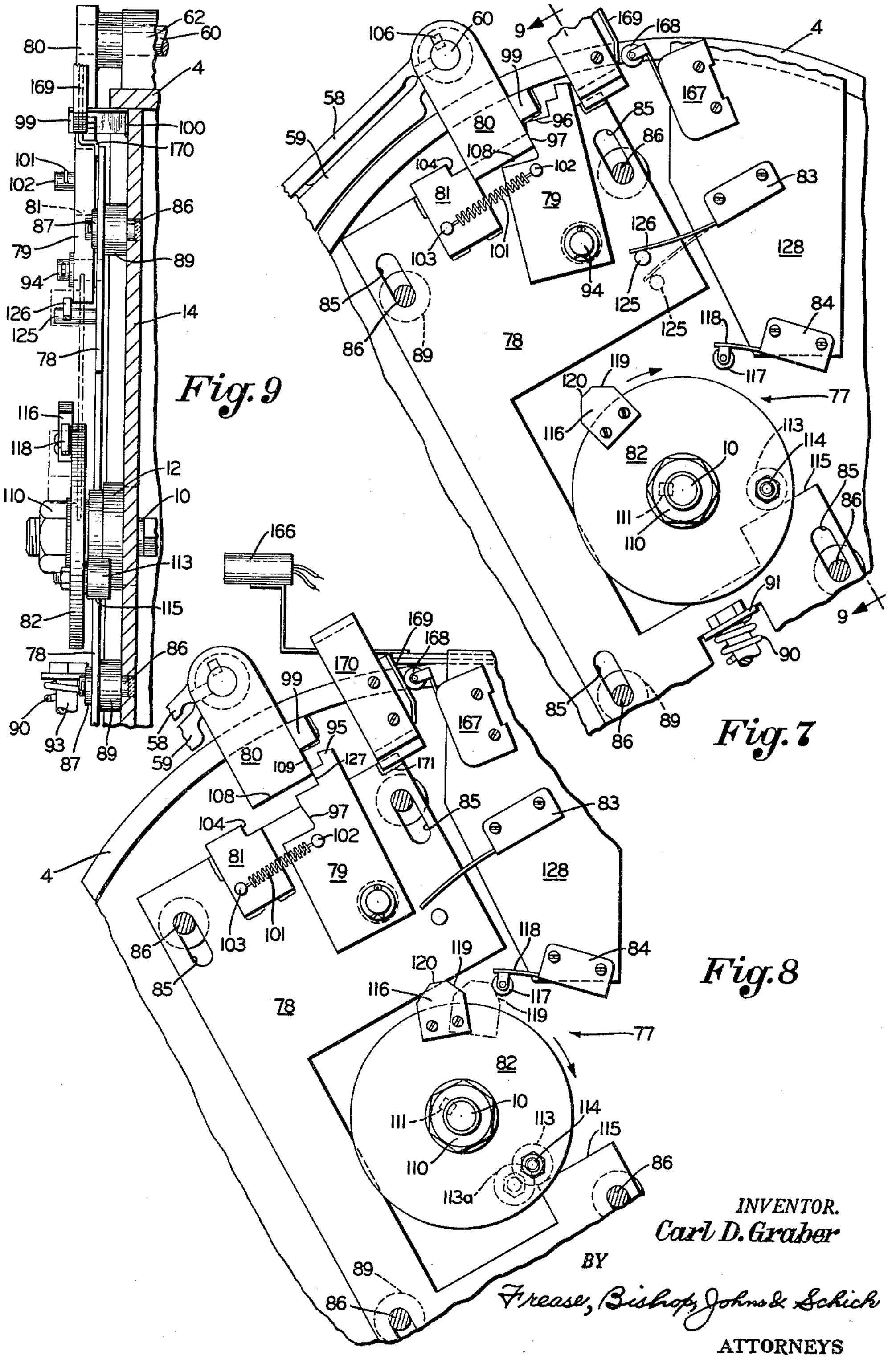
Figure 10:
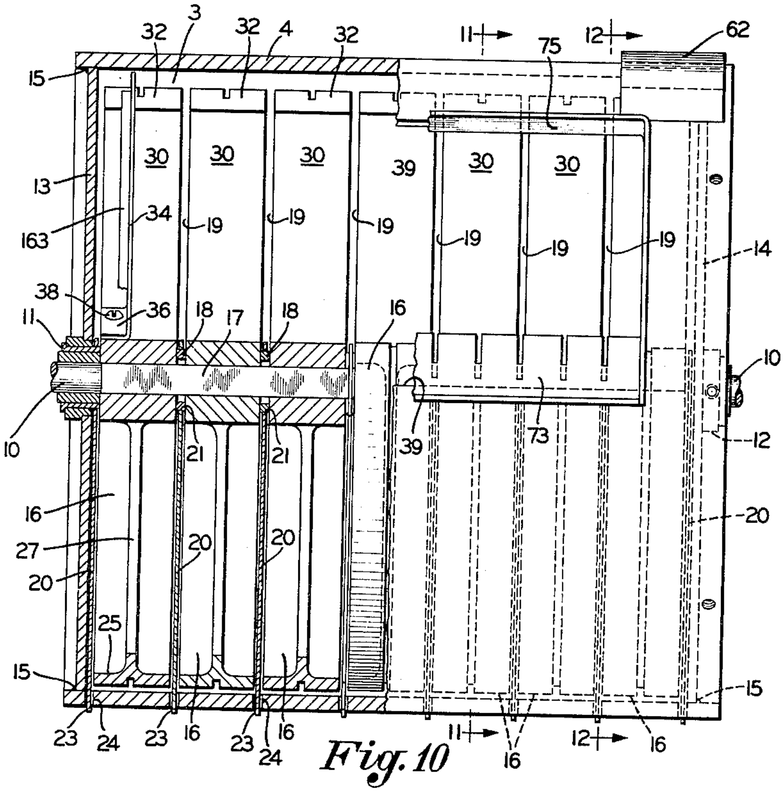
Figure 14:
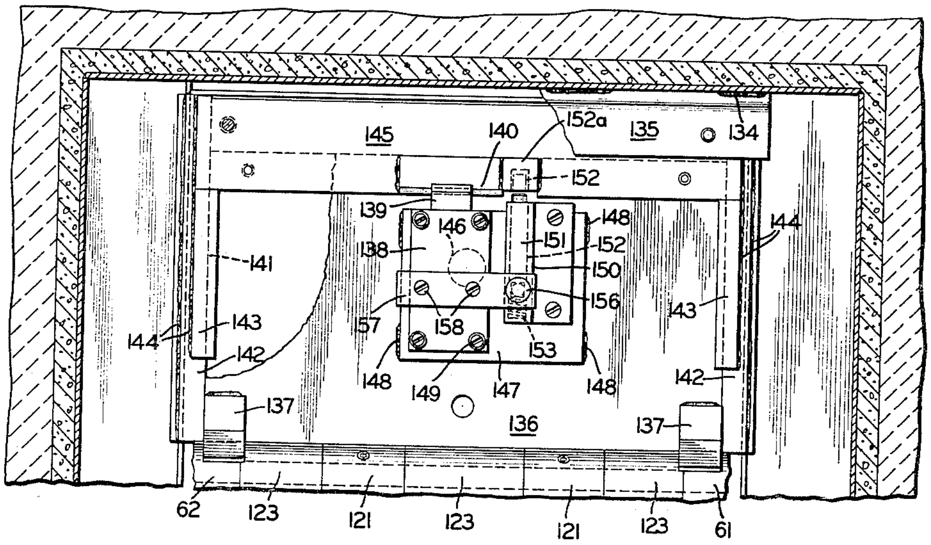
Figures 11, 12, 13, 15A:
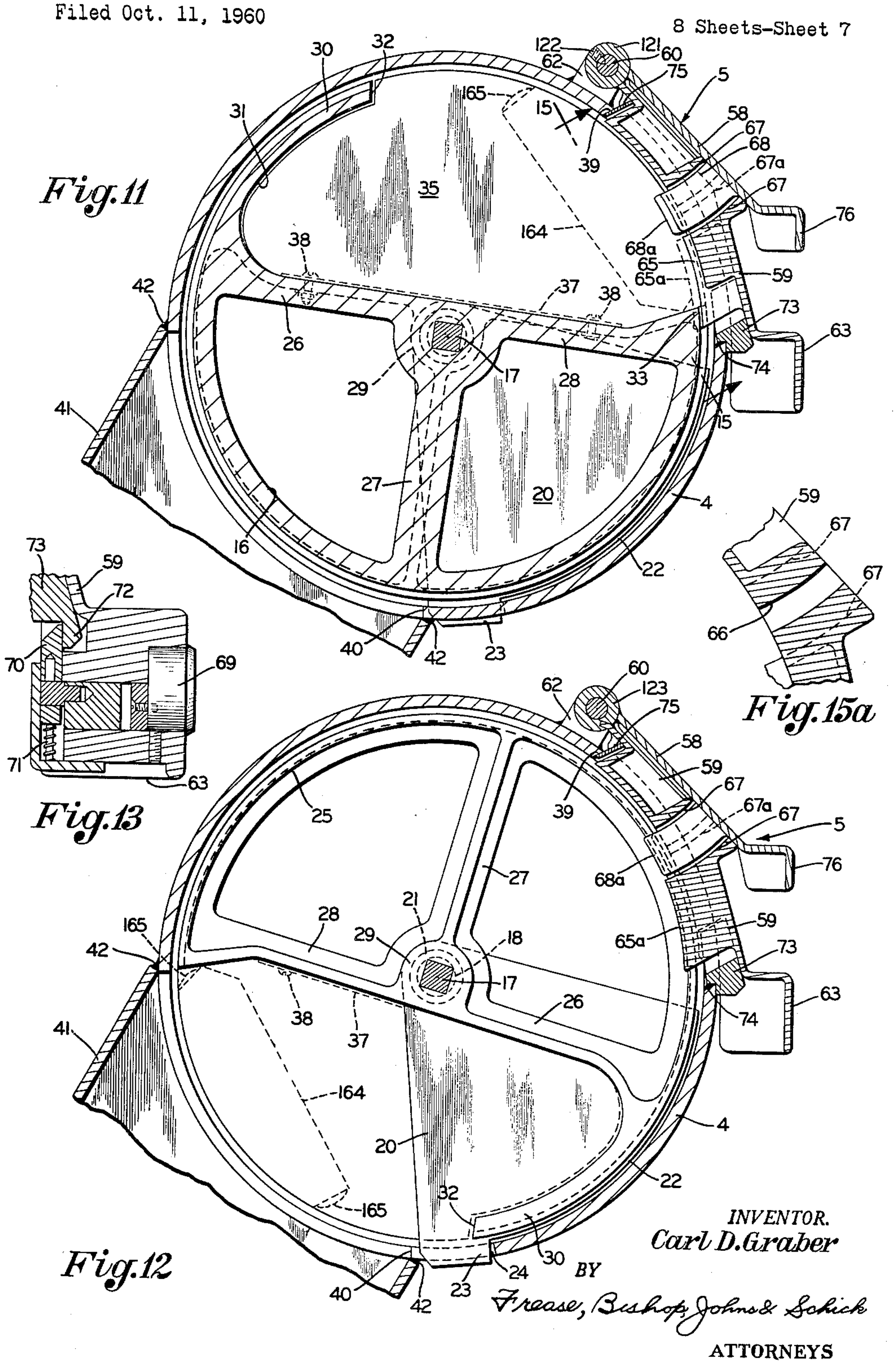
Figure 16:
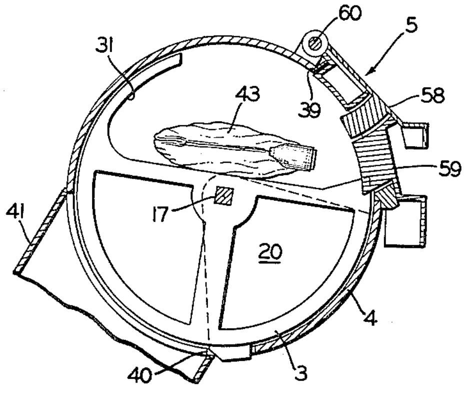
Figure 17:
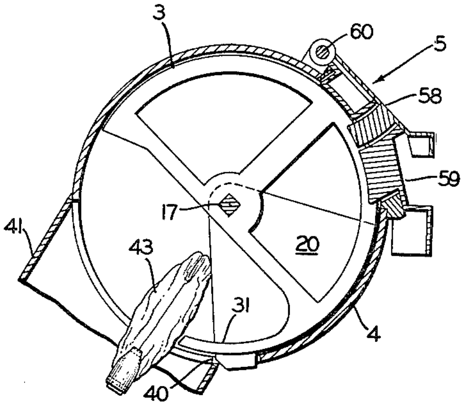
Figure 18:
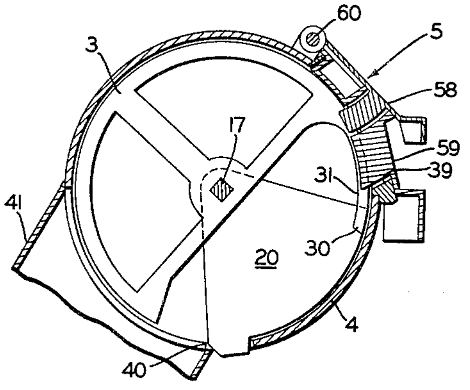
Figure 19:
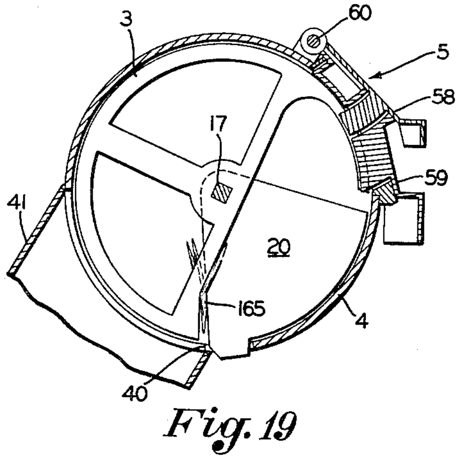
Figure 20:
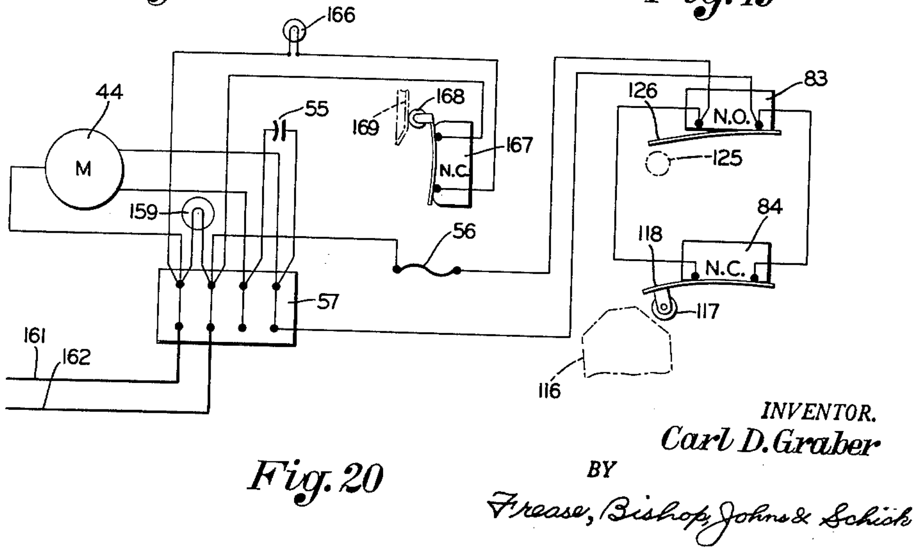

FIG. 5*a* is a fragmentary view showing the next step for actuating the locking mechanism upon closing the doors;

FIG. 6 is a view similar to FIG. 5 showing subsequent steps in the operation of the locking mechanism in response to opening and closing the doors;

FIG. 7 is a fragmentary view showing the operation of the locking mechanism upon completely closing the depository doors;

FIG. 8 is a fragmentary view showing the manner in which the cam actuates the locking mechanism as the cam approaches the end of the rotary cycle of the depository;

FIG. 9 is a sectional view of the locking mechanism taken on the line 9—9 of FIG. 7;

FIG. 10 is a longitudinal sectional view taken through the axis of the rotor and cylindrical housing;

FIG. 11 is a transverse sectional view taken on the line 11—11 of FIG. 10;

FIG. 12 is a transverse sectional view taken on the line 12—12 of FIG. 10;

FIG. 13 is a vertical sectional view of the key lock mechanism on the bag door, taken on the line 13—13 of FIG. 2;

FIG. 14 is a vertical sectional view taken on the line 14—14 of FIG. 3, showing the lock and relock means on the inside of the access door;

FIG. 15 is an enlarged sectional view showing the inside of the depository opening and the manner in which the door fins project into corresponding slots and spaces between the rotor segments, as taken on line 15—15 of FIG. 11;

FIG. 15*a* is a vertical sectional view through the opening of the envelope door taken on the line **15*a*—15*a*** of FIG. 15;

FIGS. 16 and 17 are diagrammatic views showing the manner in which a money bag is carried from the depository opening to the depository chute;

FIG. 18 is a diagrammatic view showing the manner in which the rotary flanges cover the door opening during the portion of rotation of the rotor when the depository chute is still partially open;

FIG. 19 is a diagrammatic view showing the manner in which the rotor cooperates with shear plates to cut a deposited envelope into shreds when the envelope fails to drop into the depository chute; and FIG. 20 is a wiring diagram for the depository.

Similar numerals refer to similar parts throughout the drawings.

Figure 1:
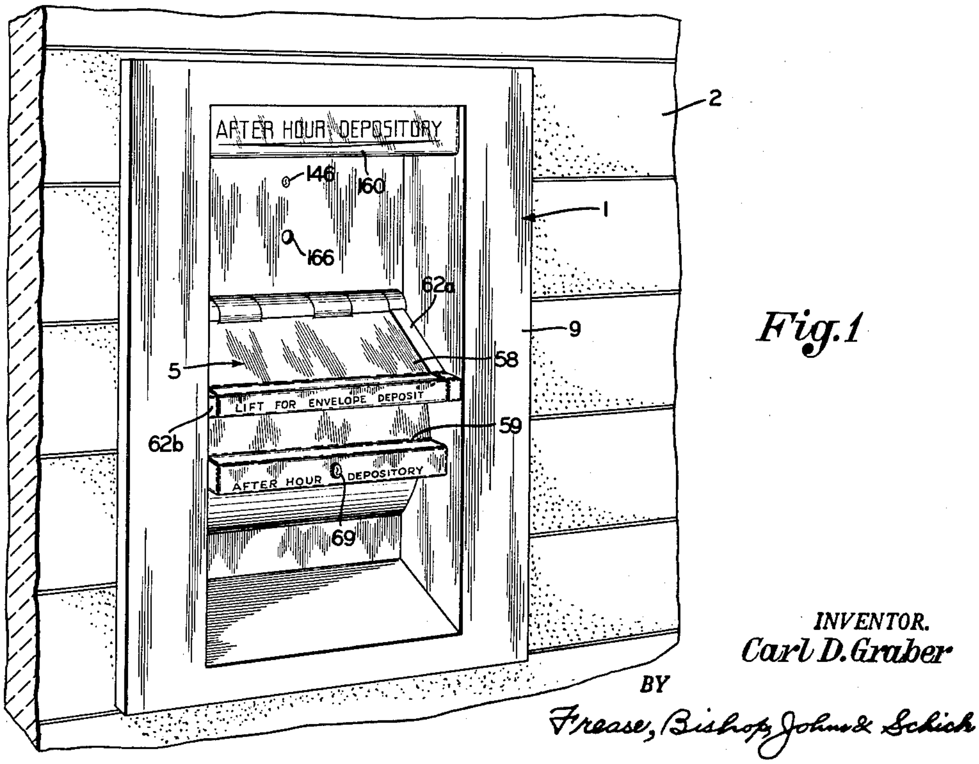
FIGURE 1 is a perspective view of an after-hour depository in the wall of a building.

In FIG. 1 an after-hour depository is generally indicated at 1 and is mounted in a wall 2 of a building. The depository 1 includes, as shown in FIG. 3, a rotor 3 within an inner housing 4, door means generally indicated at 5, and power means generally indicated at 6. The entire assembly is included within an outer housing 7 which extends through an opening 8 in the wall 2 and which is provided with an outer frame 9 (FIG. 1).

As shown in FIGS. 3, 10, and 11, the rotor 3 is a substantially circular member mounted on a central drive shaft 10, the ends of which are journally mounted at 11 and 12 (FIG. 10) for rotation of the rotor within the cylindrical housing 4. The journals 11 and 12 are secured respectively in their plates 13 and 14 which are secured by welding, such as at 15, to the housing 4.

As shown in FIG. 10, the rotor 3 includes a plurality and preferably seven rotor segments 16 which are mounted at spaced intervals on a squared cross section portion 17 of the shaft 10 so that the segments 16 rotate with the shaft when it is driven by the power means 6. Each segment 16 is spaced from the adjacent segments by a spacer 18 (FIG. 10) to provide a spacing 19 between each segment. In each spacing 19 a shear plate or baffle 20 is fixedly mounted in the lower right quarter of the housing as shown in FIG. 12. Each shear plate 20 has a substantially sector shape and is apertured at 21 for mounting on the spacer 18. The outer side 22 of the plate 20 is arcuate and is concentrically disposed within the inner side of the housing 4 and a flange 23 extends radially outwardly from the side 22 and through a slot 24 (FIGS. 10 and 12), whereby the flange cooperates with the aperture 21 for holding each plate 20 rigidly in place within the spacings 19 between the segments 16.

As shown in FIGS. 10 and 11, each segment 16 is a cast member with an outer peripheral portion 25 disposed adjacent to and within the inner surface of the housing 4. Each rotor also includes radially extending spoke portions 26, 27, and 28 which support the peripheral portion 25 with a hub portion 29 on the drive shaft 10. As shown in FIG. 11, the major portion of each rotor segment 16 is disposed below a line passing through the spoke portions 26 and 28 and the drive shaft 10. Each rotor segment 16 also includes an upwardly extending arcuate flange 30 which with the upper surface of the segment formed by the spoke portions 26 and 28 forms a receiving chamber 31 into which deposited articles are placed when the rotor is disposed in the "at rest" position of FIG. 11.

The chamber 31 is also bounded by the inner surface of the housing 4, because a portion of each rotor segment 16 is open between the end 32 of the flange 30 and the outer extremity 33 of each segment. The receiving chamber 31 is also bounded on opposite ends of the rotor by similar end wall members 34 and 35 (FIGS. 10 and 11) which have flanges 36 and 37 respectively by which each wall member is secured to the corresponding rotor segment 16 by bolts 38.

As shown in FIGS. 10 and 11, the housing 4 is a cylindrical member having openings 39 and 40 substantially diametrically disposed. The opening 39 is substantially coextensive with the rotor 3 and is closed by the door means 5 as shown in the drawings. The opening 39 is large enough for the placement of a money bag or similar object into the receiving chamber 31. The opening 40 is larger than the opening 39 and communicates with a depository chute 41, the upper ends of which are secured to the housing 4 by similar welds 42.

Accordingly, when an article such as a money bag 43 (FIG. 16) is deposited in the chamber 31, the rotor rotates counterclockwise upon closing of the door means 5 until the open side of the chamber is in alignment with the opening 40, whereupon the bag 43 (FIG. 17) drops into the depository chute 41 and downwardly into a conventional safe or depository chest (not shown).

As shown in FIGS. 2 and 3, the power means 6 for turning the rotor 3 includes a motor 44, a continuous link chain 45 extending over and around a pinion 46 on the motor shaft, and a sprocket 47 that is keyed on the drive shaft 10. To prevent backward rotation of the rotor 3, a back-stopping ratchet 48 is mounted on one side of the sprocket 47 by spaced rivets 49.

A pawl 50 is pivotally mounted on a pin 51 on the end plate 13 for engagement with the ratchet 48, making it impossible for anyone to reversely rotate the rotor for any reason; such as for fishing a previously deposited article upwardly through the chute. As shown in FIG. 3, the motor 44 is mounted on a plate 52 on the upper side of the housing 4. The motor shaft 44*a* is provided with a shaft coupling 53 and extends through a bearing 54. The plate 52 also serves as a mounting place for a capacitor 55 and a fuse 56, as well as for a terminal strip 57.

The door means 5 preferably includes a letter cover or door 58 and a bag cover or door 59. Both doors 58 and 59 are mounted on a hinge pin 60 extending across the upper side of the opening 39. The hinge pin 60 is mounted at opposite ends in hinge blocks 61 and 62 that are preferably welded on the outer surface of the housing 4. As shown in FIGS. 1 and 3, a filler block 62*a* is mounted between one end of the letter door 58 and the outer frame 9. Likewise, a filler block 62*b* is mounted between the other end of the letter door 58 and the other side of the frame 9. Each block 62*a* and 62*b* has a top surface configuration similar to that of the letter door 58 and is aligned with the door in closed position. Accordingly, it is intended that a depositor should take the precaution of closing the door 58 completely and in alignment with the blocks 62*a* and 62*b* before leaving the depository.

As shown in FIGS. 11, 12, and 15, the door 59 covers the entire opening 39 and is provided with a handle 63 at the lower end so that the door can be opened for insertion of a large article such as a money bag 43 (FIG. 16) into the compartment 31 through the opening 39. The inner side of the door 59 is provided with a plurality of spaced, vertical, inwardly extending fins 65 on the lower portion. When the door 59 is closed, the fins 65 push a deposited article, such as the money bag 43, completely into the receiving compartment 31 to prevent any part of the bag from becoming caught between the outer peripheral portion of the rotor and any part of the housing, such as the upper end of the opening 39.

As shown in FIGS. 11, 12, and 15, alternate fins 65*a* are wider than adjacent fins 65 and are aligned with and extend partially into the spaces 19 between the rotor segments 16. Thus the inner end portions of the fins 65*a* extend beyond the inner ends of the adjacent fins 65 (FIGS. 11 and 15) and thereby push any deposited object further into the receiving chamber 31 than would be otherwise possible.

The bag cover or door 59 also includes a horizontal opening 66 (FIGS. 15 and 15*a*) through which letters are inserted into the depository upon merely lifting the letter door 58. At spaced intervals along the opening 66 a plurality of vertical slots 67 are provided, which slots receive fins 68 that are mounted on the inner surface of the door 58 and extend inwardly therefrom through the slots. A web 67*a* extends between the adjacent fins 68. The purpose of the fins 68 is to push any deposited envelope completely through the opening 66 when the door 58 is closed so that upon rotation of the rotor 3 an envelope deposited will not be caught with a portion remaining in the opening, resulting in damage to the envelope and its contents.

As shown in FIG. 15, the fins 68 are aligned with the fins 65 of the lower portion of the door 59 and in addition, certain fins 68*a* aligned with fins 65*a* are longer than adjacent fins 68 and protrude (FIG. 11) slightly beyond the outer surface of the rotor. But inasmuch as the fins 65*a* and 68*a* are aligned with the spaces 19 between the rotor segments 16, the longer fins 68*a*, like the fins 65*a*, do not interfere with rotation of the rotor and serve the purpose of pushing any deposited envelope completely into the receiving chamber 31 and out of the opening 66.

As shown in FIGS. 1, 2, and 13, the bag door 59 is provided with a depositor operated key lock 69 which, among other things, includes a locking bolt 70 which is spring-biased upwardly by spring means 71 into the locked position behind a lip 72 which is part of a filler bar 73 which extends along the lower side of the opening 39 and which is secured by a weld 74 to the housing 4. The other three sides of the opening 39 are enclosed within an inverted U-shaped frame 75 (FIGS. 11 and 15) which with the filler bar 73 provides contact with the inner surface of the door 59 around the four sides of the opening 39 when the door is closed.

The door means 5 includes the doors 58 and 59, the former of which is lifted by a handle 76 at the lower end without the depositor using any key, to permit the deposit of an envelope through the opening 66 in the door 59. Similarly, the door 59, which may be opened only by a depositor having a key for the lock 69, is opened by lifting the handle 63 so that a larger article, such as a money bag 43, can be deposited through the opening 39 into the chamber 31. When the bag door 59 is lifted, the letter door 58 is also lifted. However, when the letter door 58 is lifted, the bag door 59 remains in the closed position over the opening 39.

In addition to the rotor 3, the housing 4, the door means 5, and power means 6, the depository 1 also includes means for locking the doors shut during operation of the rotor and for starting and stopping operation of the motor upon closing of the doors. Said locking means is generally indicated at 77 in FIG. 4 and includes a locking plate 78, a locking or trigger lever 79, a trigger actuator 80, a stop block 81, a cam 82, and power means microswitches 83 and 84. As shown in FIGS. 4 and 9, the locking plate 78 is a C-shaped member having a guide slot 85 at each corner. A pin 86 extends from the end plate 14 through each slot 85 where it is retained by similar washers 87 and cotter pins 88. The plate 78 is spaced from the end plate 14 by spacers 89 mounted on each pin 86 between said plates (FIG. 9). The locking plate 78 is pressed to an uppermost position with the pins 86 located at the lower ends of the slots 85 (FIG. 7) by a spring 90 at the lower end of the plate. This position (FIG. 7) is the door-locked position after the door has been closed. The spring is disposed between an outturned flange 91 on the plate 78 and a flanged bracket 92 on the plate 14.

As shown in FIG. 4, a nut and bolt assembly 93 extends between the flange 91 and the bracket 92, as well as through the spring 90. In that manner the spring 90 urges the plate 78 upwardly when the spring functions, to the position shown in FIG. 7.

The locking lever 79 is pivotally mounted on a pivot pin 94 extending from the plate 78. The upper end of the lever extends above the upper end of the plate 78 and has a step-shaped upper end portion which includes an uppermost end surface 95, intermediate end surfaces 96 and 96*a*, a step surface 97, and an end surface 98. The lever 79 is normally retained in the "door-unlocked" position of FIG. 4 with the surface 96 in abutment with a surface 108 of actuator 80. Stop 99 is preferably secured by a weld 100 to the plate 14. As shown in FIG. 4, the lever 79 is inclined at an angle with its center of gravity to the left of the pin 94 so that the lever is biased by gravity toward the block 81. However, a spring 101 may be added to retain the lever 79 in said position with one end of the spring attached to a pin 102 on the lever and with the other end of the spring attached to a pin 103 of the stop block 81. The block 81 is secured, preferably by welding, on the upper end of the plate 78 and is provided with a notch 104.

The lever actuator 80 is mounted at its upper end on the hinge pin 60 where it is secured by a key 106. In addition, a set screw 107 is provided for preventing the actuator 80 from moving longitudinally off the end of the hinge pin 60. The actuator 80 also includes a lower end surface 108 as well as an edge surface 109 which function with the intermediate end 96 and step surface 97 of the locking lever 79 to actuate the entire locking mechanism as well as rotation of the rotor.

The cam 82 is a disk mounted on the drive shaft 10 where it is secured by a nut 110 and a key 111. The cam 82 is spaced from the end plate 14 by the bearing or journal 12, as shown in FIG. 9. A cam roller 113 is mounted on a mounting pin 114 on the undersurface of the cam 82 and as the cam rotates, the roller 113 is brought into engagement with an edge surface 115 of the locking plate 78 to urge the plate, if in the position of FIG. 7, downwardly against the spring 90. A cam extension 116 is mounted on the outer peripheral portion of the cam 82 which functions with a roller 117 on the end of a lever 118 of the microswitch 84, whereby the cam extension actuates the switch which is normally closed to stop operation of the motor when the roller 117 rides over an inclined surface 119 to a resting position on an end surface 120 of the extension (FIG. 4).

The depository 1 is normally in the unlocked position for the doors 58 and 59 with the locking means 77 disposed in the position shown in FIG. 4. In that position the doors 58 and 59 may be opened, and as shown in FIGS. 11 and 12, the letter door 58 is secured to a pair of spaced hinge members 121 (FIG. 2) on the hinge pin 60 by set screws 122.

The bag door 59 depends from hinge members 123 (FIG. 2) which, as shown in FIG. 12, are rotatably mounted on the hinge pin 60. Accordingly, the letter door 58 may be opened when the bag door 59 is locked in place with the hinge pin 60 rotating within the hinge members 123 of the bag door, but when the bag door 59 is opened, the envelope door 58 moves with the door 59 and therefore rotates the hinge pin 60.

As shown in FIGS. 4–9, rotation of the hinge pin 60 upon opening the doors 58 and 59 also turns the locking lever actuator 80 clockwise from the position of FIG. 4 ultimately to the dotted position of FIG. 5 with the doors in the fully open position for deposit of an article into the depository. When the doors are initially opened, the corner of the actuator 80 (formed by the lower end surface 108 and the edge surface 109) moves clockwise as viewed in FIG. 5 across the intermediate end surface 96 of the locking lever 79.

The distance between the axis of the hinge pin 60 and said corner is greater than the distance from said axis to the center of the lower end surface 108. Thus, the locking plate 78 moves downwardly a slightly distance about equal to spacing 124 (FIG. 4) normally existing between each pin 86 and the upper end of each slot 85 when the depository is in the unlocked position of FIG. 4. Thereafter, as soon as the lower end surface 108 of the locking lever actuator 80 clears the end surface 96, the spring 90 urges the locking plate 78 upwardly to place the upper end surface 95 of the lever 79 in abutment with the stop 99 (FIG. 5*a*).

The locking lever actuator 80 is then rotated to the broken line position of FIG. 5 upon complete opening of the doors 58 and 59 or door 58 and upon closing of the doors, the lower end portion of the edge surface 109 is brought into contact with the step surface 97 of the lever 79, as shown in FIG. 5*a*. Complete closing of the doors 58 and 59 causes the locking lever actuator 80 to rotate the trigger lever 79 about its pivot pin 94 against the spring 101 to the position shown in FIG. 7 with the lower corner in contact with the step surface 97. However, between the positions shown in FIGS. 5*a* and 7, the upper edge 95 of the lever 79 is moved out of contact with the stop 99, whereupon the spring 90 urges the locking plate 78 upwardly until the surface 97 abuts the surface 109 of the actuator 80. With that movement of the plate 78 a switch pin 125 moves a lever 126 of the microswitch 83 to the upper position, as shown in FIG. 7, and thereby closes the circuit through the motor 44.

As shown in FIG. 6, the doors 58 and 59 may be locked in an intermediate position to prevent theft before they are completely closed. With some depositories it is possible for a thief to attach a block or other small object to the inner surface of the depository door to prevent the door from being completely closed. Subsequently, an unsuspecting depositor who has made a deposit leaves the depository without noticing that the door is not completely closed. Thereafter, the thief returns to the depository, opens the door and withdraws the deposited article. In order to prevent such theft, the members 79, 80, and 81 are provided with an intermediate locking position. The lever 79 is notched at the upper end to provide the intermediate end surface 96*a*. Likewise, the block 81 is notched at the upper corner to provide the edge surface 104. Accordingly, if a small block or other object is placed against the inner surface of one door 58 or 59 to prevent its being completely closed, when the doors 58 and 59 are closed sufficiently the lever actuator 80 moves the lever 79 clockwise to move the end surface 95 out of abutment with the stop 99 and brings the end surface 96*a* into contact with the stop. At the same time, the left corner of the actuator 80, as viewed in FIG. 6, moves into the notch of the block 81 and into engagement with the edge surface 104. Thereafter it is impossible to raise the doors because the actuator 80 is held against clockwise rotation by the surface 104.

When the doors 58 and 59 are completely closed, the plate 78 moves to the uppermost position shown in FIG. 7, and the lower left corner of the lever actuator 80 is blocked from clockwise rotation by the block 81 so that it is impossible to open either door 58 and 59 during operation of the depository.

As the motor 44 rotates the rotor 3 on the drive shaft 10 in a clockwise direction as viewed in FIG. 7, the cam 82 also rotates clockwise from the position of FIG. 4 through a one cycle revolution of 360°. During rotation of the cam, the cam roller 113 is brought into contact with the edge 115 of the locking plate 78 and continued rotation of the cam 82 urges the plate 78 downwardly against the spring 79 until the roller clears the left end of the edge 115 as shown in FIG. 8. At that position the rotor is approaching the completion of its cycle by bringing the receiving chamber 31 into realignment with the opening 39 of the housing 4. At the same time the surface 97 of the lever 79 moves downwardly along the surface 109 of the actuator until said surfaces clear each other, permitting the spring 101 to rotate the lever 79 counterclockwise about the pin 94 until a surface 127 is brought into abutment with the surface 109 as shown in FIG. 8.

At that position, the roller 113 moves off the left end of the edge 115 to a position 113*a*, during which movement the cam extension 116 moves into contact with the roller 117 of the switch 84 and as the roller rides upwardly over the inclined surface 119, the switch 84 is opened, which stops the motor 44 with the mechanism in the position of that shown in FIG. 4. The switches 83 and 84 are mounted on a bracket 128, the upper end of which is secured by similar screws 129 to the plate 52.

As shown in FIGS. 6–7, the depository is provided with an operation light 166 which is evident to the depositor in FIG. 1. The light 166 is connected to a microswitch 167 which is operated by a cam following roller 168. The switch 167 is mounted on the bracket 128. A cam 169, associated with the roller 168, is mounted on a bracket 170 which is secured by a weld 171 on the plate 78.

The light 166 operates only when the rotor 3 turns. After a deposit is made and the doors are completely closed to the locked position of FIG. 7, the plate 78 has moved the cam 169 upwardly out of contact with the cam following roller 168 so that the normally closed switch 167 turns on the light 166. As soon as the rotor 3 completes its cycle of rotation, the plate 78 returns to the unlocked position of FIG. 4, bringing the cam 169 downwardly into contact again with the cam following roller 168 and turning off the light 166.

As shown in FIG. 6, when the doors 58 and 59 are closed to the intermediate position, which position may be achieved by the placement of a "defeat measure" block or other object on the inner surface of the door to perpetrate a theft, the cam following roller 168 remains on the cam 169 and does not turn on the light 166. As a result, even though the doors cannot be reopened due to the position of the actuator 80 as shown in FIG. 6, the failure of the light 166 to turn on indicates to the depositor that the depository is out of order and that the rotor has not transmitted the deposited article to the depository chute. Thus the depositor can notify the proper authority of the malfunctioning of the depository.

The depository 1 is mounted in an opening 8 in the wall 2 as shown in FIG. 3 and the outer housing 7 provides the outer limits of the depository. In addition, a front wall is provided for mounting the inner housing 4 in place and it includes a lower wall 130 and an upper wall 131. The lower wall 130 includes an angle 132 as well as laminated plates 133, all of which are appropriately secured together. The angle 132 is welded at 134 to the housing 7. The upper edges of the plates 133 abut the outer surface of the housing 4.

The upper wall 131 also includes an angle 135 secured to the upper side of the outer housing 7 by welds 134. In addition, the upper wall 131 includes an access door 136 which, as shown in FIG. 14, is detachably mounted by brackets 137 at the lower corners and which is provided with a lock 138 having a bolt 139 that in the locked position engages a flanged bracket 140 (FIG. 3). The access door 136 closes an opening 141 in the upper wall 131 by which maintenance of the several operating parts including the motor 44, the capacitor 55, the fuse 56, and the terminal strip 57 may be had. The opening 141 is reinforced by laminated strips 142 and 143 which are secured together, preferably by similar welds 144. Likewise, a horizontal reinforcing strip 145 is provided across the top of the opening to further reinforce the door opening.

The key lock 138 having a keyhole 146 (FIG. 1) is mounted on a maintenance plate 147 which is secured to the inner surface of the door 136, preferably by similar welds 148. If for any reason the lock 138 is tampered with, such as by drilling through the door 136 and plate 147 in order to dislodge screws 149 that mount the lock in place, a relock 150 immediately operates to continue to hold the door 136 in place. The relock 150 includes a cylinder 151 and a plunger 152 which is spring-biased upwardly by a helical spring 153 located below the plunger within the cylinder. The lower end portion of the plunger is provided with a notch 154 and the cylinder is apertured at 155 and the notch and aperture are held in alignment against the spring 153 by a pin 156, the outer end of which is secured to a connecting bar 157 which is secured to the back of the lock 138 by similar screws 158. Accordingly, when the lock 138 is dislodged surreptitiously, the bar 157 is dislodged with the lock and the pin 156 moves out of the notch 154 and permits the plunger 152 to move upwardly into an apertured block 152*a* mounted on the bracket 140. The apertured block 152*a* is situated relatively close to the upper end of the cylinder 151 and completely encloses the upper end of the plunger 152 to prevent downward manipulation of the plunger from the locked position upon insertion of a tool of suitable configuration into and through the keyhole 146 which is opened by forced removal of the key lock 138.

In addition to the foregoing, a lamp 159 (FIG. 2) may be provided at the upper side of the depository and a translucent cover 160 is provided around the lamp.

As shown in FIG. 18, the rotor 3 passes through a position in which the opening 40 to the chute 41 is not completely covered by one end of the rotor. In that position the uncovered portion of the opening 40 would be in direct alignment with the depository opening 39 if it were not for the arcuate flange 30 which completely covers the opening 39 so long as any portion of the opening 40 is not covered by the opposite side of the rotor. Thus, if an unauthorized person were to force the door 59 open with a wrecking bar during rotation of the rotor 3, further entry into the depository housing 4 would be impossible due to the rotor body and its flange which provide a complete barrier against a direct line access between the openings 39 and 40. Moreover, the plurality of spaced baffles 20 provide an additional safety measure against direct access between the openings 39 and 40.

The baffles or shear plates 20 also serve an additional purpose as shown in FIG. 19. Without the baffles or shear plates 20, where an adhesive material, such as adhesive tape or glue, is applied to the surfaces of the rotor sectors 16 forming the chamber 31 in a surreptitious manner, an envelope 165 subsequently deposited in the chamber would adhere to the segments 16 and return with the rotor 3 to the "at rest" position without dropping into the chute 41. However, the shear plates or baffles 20 prevent such an occurrence, as shown in FIG. 19, because as the rotor 3 turns counterclockwise an envelope 165 is cut into shreds between the rotor segments 16 and the edges of the shear plates 20. Or, if the envelope 165 contains sufficiently bulky material, such as money and a bank deposit book, to resist cutting between the shear plates 20 and the rotor segments 16, the resistance stalls the motor 44 and prevents completion of the cycle of rotation. In any event, theft of the envelope and its contents is defeated.

In FIG. 20, the wiring diagram shows the motor 44, the capacitor 55, the fuse 56, and the lamp 159 connected to the terminal strip 57 to which lead wires 161 and 162 are connected with a source of A.C. current. In addition, the microswitch 83, which is normally open, and the microswitch 84, which is normally closed, are interconnected with the motor and terminal strip, as well as with each other, to function in the manner set forth above. That is, the switch 83, being the main switch, will not operate the motor until the switch 83 is closed by the pin 125 (as shown in FIG. 7). The switch 84, which is normally closed, is opened by the cam extension 116 (as shown in FIG. 4). Accordingly, the switch 83 initiates operation of the motor 44 and after the cam 82 starts to rotate, the cam extension 116 moves away from the switch 84, returning it to the normally closed position.

Thereafter, when the pin 125 returns to its lower position (FIG. 7), the normally closed switch 84 continues to operate the motor until the cam extension 116 again comes into contact with the switch roller 117 and again opens the switch. In such position, both switches 83 and 84 are open.

Finally, the wiring diagram includes a normally closed microswitch 167 having a roller 168 that engages the cam 169 to maintain the line open through the operating light 166. After a deposit is made and the doors 58 and 59 are completely closed, the locking mechanism including the plate 78 moves up and takes the cam 169 out of contact with the roller 168, closing the circuit through the switch 167 and the light 166.

As shown in FIGS. 10, 11, and 12, a pair of counterweights 163 and 164 are mounted on the end wall members 34 and 35, respectively, by means of similar welds 165. The counterweights compensate for the lack of weight in the portion of the rotor providing the receiving chamber 31. Thus the rotor may be turned in a smoother manner without incurring an otherwise unbalanced load on the motor 44.

The device of the present invention provides an after-hour depository which avoids problems inherent in prior art depositories. The depository 1 is operated by electric power means which function automatically upon closing of the door after making a deposit. During the operation of the depository, the device provides means for locking the depository doors and thereby preventing surreptitious entry by unauthorized persons. Moreover, if there is a power failure during operation of the device, the doors remain locked in place until power is restored and the cycle of the deposit is completed. More importantly, when the power fails when the device is in the unlocked position of FIG. 4 and a deposit is made by a person unaware of the power failure, the depository doors are thereafter locked in place until the power is restored. In that manner the last deposit is protected within the depository even though the rotor cannot function to deliver the deposited item to the depository chute.

In addition, the provision of a single rotor permits a control of the automatic power means including the rotor which is susceptible to one revolution of the rotor. The rotor is also provided with a "no back" control mechanism which is an additional safety measure that inhibits unauthorized entry which might be otherwise possible due to backward manipulation of the rotor.

The act of opening and closing the doors initiates not only a door locking mechanism but also starts the power mechanism into operation. The doors are also provided with inwardly projecting fins that push a bag or envelope completely into the receiving chamber and thereby permit complete closure of the doors. Without completely closing the doors it is impossible to initiate the operation of the depository mechanism.

An additional safeguard is provided by the locking mechanism which is initiated upon closing the doors. Where a block or other small object is attached to the inner surface of one of the doors in an unobtrusive manner to prevent complete closing of the door after a deposit is made, the locking mechanism is provided with an intermediate locking means which operates upon closing of the doors to a sufficient extent which to the unsuspecting depositor appears to be completely closed. Theft is thereby avoided because the person who has attached the block to the door cannot subsequently open the doors to remove the deposited article.

Moreover, the device includes a depository rotor which is composed of spaced rotor segments having intermeshing shear plates or baffles, which plates not only block a direct passage between the depository opening and the chute, but also prevent any deposited articles from being returned on the rotor to the receiving chamber due to surreptitious acts on the part of others, such as preliminarily placing an adhesive within the compartment prior to depositing the envelope or bag.

In the foregoing description certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

Moreover, the description of the improvements is by way of example and the scope of the present invention is not limited to the exact details illustrated, or to the specific mechanisms shown.

Having now described the features, discoveries and principles of the invention, the construction, operation and use of the improved mechanisms and the advantageous, new and useful results obtained thereby; the new and useful parts, elements, constructions, mechanisms, combinations, subcombinations, and arrangements, and mechanical equivalents obvious to those skilled in the art, are set forth in the appended claims.

What is claimed is:

1. An after-hour depository including a housing having an article-receiving opening and having a discharge opening, a horizontal rotor axially rotatable in the housing and having a radially opening receiving chamber selectively registrable with the article-receiving opening and with the discharge opening, power means for rotating the rotor through a 360° cycle, door means for the article-receiving opening, and means operatively connected to the door for initiating operation of the power means and for locking the door means closed upon closing of the door means.

2. An after-hour depository including a housing having an article-receiving opening and a discharge opening, a rotor horizontally axially rotatable in the housing and having a radially opening chamber selectively registrable with the article-receiving opening and with the discharge opening, power means for rotating the rotor through a 360° cycle, door means for the article-receiving opening, and means operatively connected to the door and to the rotor for initiating operation of the power means and for locking the door means closed upon complete closing of the door means and for maintaining the door means in the closed position during rotation of the rotor throughout the 360° cycle.

3. An after-hour depository including a cylindrical housing having an article-receiving opening and an article-discharge opening, a rotor axially rotatable on a drive shaft in the housing and having a radially opening, article-receiving chamber selectively registrable with the openings, a motor for rotating the rotor through a 360° cycle, a door for the article-receiving opening mounted on a hinge pin, means for operating the motor including an electric switch, a lever actuator, locking plate means and a cam, the lever actuator being mounted on the hinge pin and movable with the door, the locking plate means being spring-biased to a switch-closing position, the cam being mounted on the drive shaft and operable near the end of its rotation cycle for moving the locking plate means from the electric switch-closing position to the electric switch-opening position, and the locking plate means being movable to the spring-biased switch-closing position upon closing the door of the article-receiving opening.

4. An after-hour depository including a cylindrical housing having an article-receiving opening and an article-discharge opening, a rotor mounted on a horizontal drive shaft in the housing and having a radially opening article-receiving chamber selectively registrable with the openings, a motor operatively connected to the drive shaft, a door for the article-receiving opening, means for locking the door closed upon closing the door after an article has been deposited in the chamber, the means for locking the door including a lever actuator, a locking plate, a trigger lever, and a cam, the locking plate having a block member and being spring-biased to a position in which the block member blocks movement of the lever actuator, the trigger lever being pivotally mounted on the locking plate and normally holding the locking plate away from the spring-biased position, the trigger lever being movable out of its normal position by the lever actuator upon closing of the door, the cam being mounted on the drive shaft and actuating the locking plate out of the lever actuator locking position, and an electric switch for the motor adjacent the locking plate and being movable between closed and open switch positions upon movement of the locking plate to the spring-biased and non-biased positions respectively.

5. An after-hour depository including a cylindrical housing having an article-receiving opening and an article-discharge opening and having end walls, a rotor mounted on a drive shaft in the housing, a motor connected to the drive shaft for rotating the rotor through a 360° cycle, the rotor having a radially opening, article-receiving chamber selectively registrable with the openings, a door for the article-receiving opening and mounted on a hinge pin, a lever actuator on the hinge pin, a locking plate slidably mounted on one end wall of the housing and movable between a lever actuator locked position and an unlocked position and being spring-biased in the locked position, a trigger lever pivotally mounted on the locking plate and being biased in a position for holding the locking plate in the unlocked position, the lever actuator being rotatable upon closing the door to pivot the trigger lever out of its biased position, a cam on the drive shaft and rotatable to a position for moving the locking plate to the unlocked position, the trigger lever being returnable to its biased position upon operation of the cam upon the locking plate, and a normally open electric switch mounted near the locking plate and movable to the closed position for operating the motor upon movement of the locking plate to the spring-biased, lever actuator locked position.

6. An after-hour depository including a cylindrical housing having an article-receiving opening and an article-discharge opening and having end walls, a rotor mounted on a drive shaft in the housing, a motor operatively connected to the drive shaft for rotating the rotor through a 360° cycle, the rotor having a radially opening, article-receiving chamber selectively registrable with the openings, a door for the article-receiving opening and mounted on a hinge pin, a lever actuator on the hinge pin, a locking plate slidably mounted on one end wall of the housing and movable between a lever actuator locked position and an unlocked position and being spring-biased in the locked position, a trigger lever pivotally mounted on the locking plate and being biased in a position of end-to-end abutment with an end of the lever actuator in which position the locking plate is held in the unlocked position, a cam mounted on the drive shaft, the lever actuator being movable from the position of end-to-end abutment with the trigger lever to a position of pivoting the trigger lever out of its biased position upon closing the door, the cam being rotatable to a position for moving the locking plate to the unlocked position, the trigger lever being rotatable to its biased position upon operation of the cam upon the locking plate, and a normally open electric switch mounted near the locking plate and movable to the closed position for operating the motor upon movement of the locking plate to the spring-biased, lever actuator locked position.

7. An after-hour depository including a cylindrical housing having an article-receiving opening and an article-discharge opening, a rotor mounted within the housing and having an article-receiving chamber selectively registrable with the openings, motor means for rotating the rotor through a 360° cycle, a door for the article-receiving opening and mounted on a hinge pin, a lever actuator mounted on the hinge pin at one end of the housing, a locking plate slidably mounted at said one end of the housing and being movable between door-locked and unlocked positions and being biased in the locked position, the lever actuator being movable between door-open and door-closed positions, block means on the plate for preventing movement of the lever actuator from the door-locked position when the locking plate is disposed in the door-locked position, a trigger lever pivotally mounted on the locking plate and movable between positions of abutment and non-abutment with the lever actuator, the trigger lever being biased in the position of abutment with the lever actuator, the trigger lever being movable out of the position of abutment upon movement of the lever actuator to the door-closed position, the locking plate being movable to the door-locked position upon closing of the door, a cam on the rotor and engageable with the locking plate for returning the plate to the unlocked position upon completion of one revolution of the rotor, the trigger lever being movable to the position of abutment with the lever actuator upon movement of the locking plate to the unlocked position, and a normally open electric switch mounted near and operated by movement of the locking plate and movable to the closed position for operating the motor upon movement of the locking plate to the door-locked position.

8. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position, and actuator means on the door means operative after the door means has been opened and as the door means approaches closed position to actuate the lock means to prevent reopening of the door means.

9. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position, and actuator means on the door means operative after the door means has been opened and as the door means reaches fully closed position to energize the power means to rotate the receptacle means through said cycle and to actuate the lock means to hold the door means locked in fully closed position throughout movement of the receptacle means through said cycle.

10. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the reecptacle means is in normal position, actuator means on the door means operative after the door means has been opened and as the door means reaches fully closed position to energize the power means to rotate the receptacle means through said cycle and to actuate the lock means to hold the door means locked in fully closed position throughout movement of the receptacle means through said cycle, signal means, and the lock means including means operative when the power means has been energized to actuate the signal means throughout movement of the receptacle means through said cycle.

11. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position, actuator means on the door means operative after the door means has been opened and as the door means approaches closed position to actuate the lock means to prevent reopening of the door means, signal means, said actuator means also being operative as the door means reaches fully closed position to energize the power means to rotate the receptacle means through said cycle and to actuate the lock means to hold the door means locked in fully closed position throughout movement of the receptacle means through said cycle, said lock means including means operative when the power means has been energized to actuate the signal means throughout movement of the receptacle means through said cycle, and said lock means also being constructed to hold the door means locked in fully closed position when fully closed in event of failure of power for the power means which results in failure of the power means to become energized upon fully closing the door or in deenergization of the power means during movement of the receptacle means through said cycle.

12. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, said power means including switch means controlling starting and stopping of the power means, door means for said deposit opening movable to open and closed positions, lock means for said door means normally unlocked when the receptacle means is in normal position, said lock means including a member engageable with said power means start-switch; actuator means on the door means operative after the door means has been opened and as the door means reaches fully closed position to actuate the lock means to engage said member with the power means start-switch to energize the power means to rotate the receptacle means through said cycle, said lock means when actuated holding the door means locked in fully closed position throughout movement of the receptacle means through said cycle, and said rotatable receptacle means including a member engageable with said power means stop-switch to actuate said stop-switch as the receptacle means completes movement through said cycle.

13. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position; said lock means including plate means movably mounted on the housing means and movable between door-locked and door-unlocked positions; said plate means including means for moving the plate means from door-unlocked to door-locked position; means controlling the positioning of the plate means including a cam on the rotatable receptacle means and a stop member on the housing means; said stop member being engageable with and holding the plate means in door-unlocked position as the door means is opened; actuator means on the door means operative after the door means has been opened and as the door means is moved toward closed position to release the holding of the plate means by the stop member and to permit the plate means to be moved to a door-locked position by said plate moving means; said actuator means also being operative as the door means is moved to and reaches fully closed position to energize the power means to rotate the receptacle means through said cycle; said plate means in door-locked position holding the door means locked in fully closed position throughout movement of the receptacle means through said cycle; and said cam being engaged with and moving the plate means from door-locked to door-unlocked position as the receptacle means completes its movement through said cycle.

14. After-hour depository construction including housing means provided with a bag deposit opening and a discharge opening, receptacle means rotatable in one direction in said housing means through a 360° cycle from a normal position opposite the deposit opening past the discharge opening and back to normal position, power means for rotating said receptacle means through said cycle, a first door for said bag opening movable to open and closed positions, said first door being provided with an envelope deposit opening, a second door for said envelope opening movable to open and closed positions, means pivotally mounting the first and second doors on the same pivot axis, lock means for said first and second doors normally unlocked when the receptacle means is in normal position, and actuator means on one of the doors operative after either door has been opened and as such door reaches fully closed position to energize the power means to rotate the receptacle means through said cycle and to actuate the lock means to hold both doors locked in fully closed position throughout movement of the receptacle means through said cycle.

15. The construction defined in claim 14 in which each door is provided on its inner side with a plurality of spaced inwardly extending fins, and in which the fins project completely through the respective door openings and into the receptacle means when the doors are closed to clear any deposited object from either deposit opening as the door therefor is closed.

16. After-hour depository construction including housing means provided with deposit and discharge openings, a rotor, a plurality of notched-out rotor segments mounted at spaced intervals on the rotor, the notched-out portions of the rotor segments forming a rotor receptacle, the rotor being rotatable in one direction in said housing means through a 360° cycle from a normal position with the receptacle opposite the deposit opening past the discharge opening and back to normal position, a plurality of spaced sector-shaped shear plates mounted on the housing and extending between said rotor segments, said rotor segments and shear plates blocking off through passage between said deposit and discharge openings at all times, power means for rotating said rotor through said cycle, the edges of the notched-out portions of the rotor segments moving past the edges of the shear plates as the rotor moves through said cycle to cut up a deposited article adhering to the rotor segments and failing to drop through said discharge opening, door means for said deposit opening movable to open and closed positions, lock means for said door means normally unlocked when the rotor is in normal position, and actuator means on the door means operative after the door means has been opened and as the door means reaches fully closed position to energize the power means to rotate the rotor through said cycle and to actuate the lock means to hold the door means locked in fully closed position throughout movement of the rotor through said cycle.

17. After-hour depository construction including housing means provided with a plurality of deposit openings and a discharge opening, receptacle means rotatable in one direction in said housing means through a 360° cycle from a normal position opposite the deposit openings past the discharge opening and back to normal position, power means for rotating said receptacle means through said cycle, one of said deposit openings being a bag opening and another of said deposit openings being an envelope opening, a door for said bag opening, a depositor-operated key lock for said bag opening door, a door for said envelope opening, the doors each being pivotally mounted on the same axis and movable to open and closed positions, the envelope door being movable to open and closed positions independently of the bag door, the envelope door moving with said bag door when the latter is moved between open and closed positions, lock means for said doors normally unlocked when the receptacle means is in normal position, and actuator means on the envelope door operative after either door has been opened and as such door reaches fully closed position to energize the power means to rotate the receptacle means through said cycle and to actuate the lock means to hold both doors locked in fully closed position throughout movement of the receptacle means through said cycle.

18. An after-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position, actuator means on the door means operative after the door means has been opened and as the door means reaches fully closed position to energize the power means to rotate the receptacle means through said cycle and to actuate the lock means to hold the door means locked in fully closed position throughout movement of the receptacle means through said cycle, the housing means being provided with a maintenance door which when opened gives access to the power means and lock means, a key lock for said maintenance door including a case, a relocking device engageable between the maintenance door and the housing, and means connecting the relocking device and case normally holding the relocking device in unlocked position, whereby damage to the maintenance door key lock case actuates said connecting means to release the relocking device into engagement between the maintenance door and housing.

19. After-hour depository construction including housing means provided with deposit and discharge openings, receptacle means rotatable in one direction in said housing means through a 360° cycle from a normal position opposite the deposit opening past the discharge opening and back to normal position, power means for rotating said receptacle means through said cycle, door means for said deposit opening movable to open and closed positions, lock means for said door means normally unlocked when the receptacle means is in normal position, actuator means on the door means operative after the door means has been opened and as the door means reaches fully closed position to energize the power means to rotate the receptacle means through said cycle and to actuate the lock means to hold the door means locked in fully closed position throughout movement of the receptacle means through said cycle, and block means on the housing means adjacent at least one end of the door means having a top surface configuration similar to that of the door means and aligned with the door means when the latter is in fully closed position, whereby such alignment gives an indication to a depositor that the door means is fully closed.

References Cited in the file of this patent

UNITED STATES PATENTS

| | | |
|---|---|---|
| 2,030,219 | Meilink | Feb. 11, 1936 |
| 2,480,685 | Adams | Aug. 30, 1949 |
| 2,901,165 | Krug | Aug. 25, 1959 |
| 2,963,333 | Mestre | Dec. 6, 1960 |